United States Patent Office.

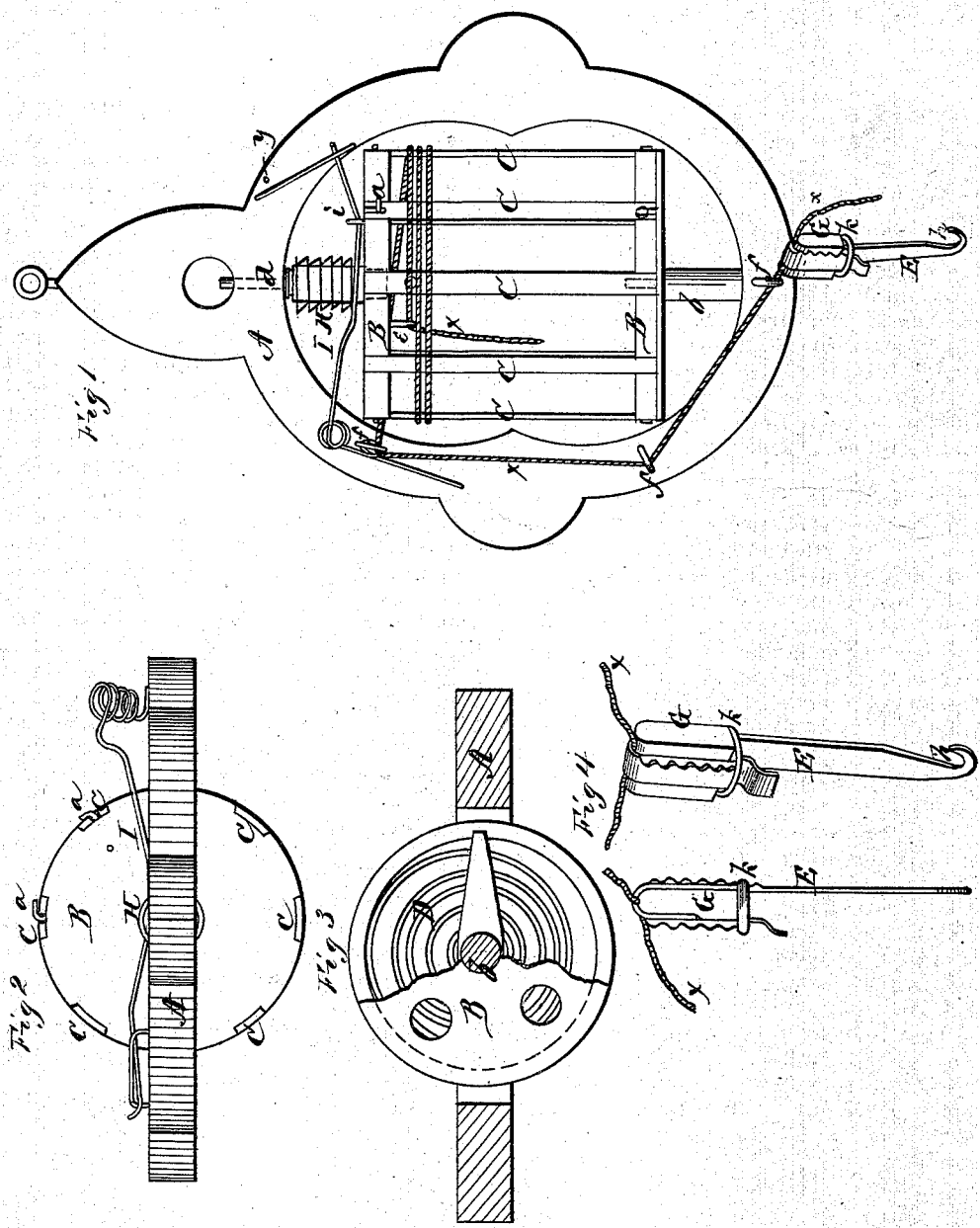
A. D. HUNTLEY & W. H. ESTY.
Twine-Holders.
No. 146,256. Patented Jan. 6, 1874.

ABIEL D. HUNTLEY AND WILLIAM H. ESTY, OF HOULTON, MAINE.

IMPROVEMENT IN TWINE-HOLDERS.

Specification forming part of Letters Patent No. 146,256, dated January 6, 1874; application filed December 8, 1873.

*To all whom it may concern:*

Be it known that we, ABIEL D. HUNTLEY and WILLIAM H. ESTY, of Houlton, in the county of Aroostook and in the State of Maine, have invented certain new and useful Improvements in Twine-Holders; and do hereby declare that the following is a full, clear, and exact description thereof, reference being had to the accompanying drawings and to the letters of reference marked thereon, making a part of this specification.

The nature of our invention consists in the construction and arrangement of a twine-holder, as will be hereinafter more fully set forth.

In order to enable others skilled in the art to which our invention appertains to make and use the same, we will now proceed to describe its construction and operation, referring to the annexed drawing, in which—

Figure 1 is a front view, and Fig. 2 a plan view, of our twine-holder. Fig. 3 is a sectional view of the bottom of the same; and Fig. 4 is an enlarged view of the twine-cutter, which acts as a stop for the movement of the twine-holder.

A represents a suitable frame, in which is pivoted a reel or cage, containing the ball of twine. The reel or cage is composed of two circular heads, B B, connected by a series of slats C C. One or more of these slats are slotted at their ends and fastened by means of hooks $a$ $a$, as shown in Fig. 1, so that they can be readily removed and put back in place for inserting and taking out the ball of twine. $b$ and $d$ are the two pivots upon which the reel or cage B C revolves. One of the heads B of the reel is hollow, and within the same is placed a spring, D, so arranged that, by turning the reel in one direction, the spring will be wound up, and as soon as the force is removed the spring will unwind and revolve the reel in the opposite direction. The twine or cord $x$, from the ball inside of the reel or cage, passes through a loop or eye, $e$, on the reel, and is wound around the reel a suitable number of times, after which it is passed through eyes or loops $f$ $f$ on the frame A, and the end hangs down so as to be in reach of the person wanting to use it. By pulling the cord $x$, the reel will be revolved in a direction to wind up the spring. Then, when the cord is cut off the spring will revolve the reel and wind up the slack of the cord. On the cord or twine $x$ is placed a sliding cutter, E, made of a single piece of metal, formed with a cutting-hook, $h$, at one end, and bent over at the other end to grasp a piece of rubber, G, which is then fastened by a ring, $k$, passed over it, as shown in Fig. 4, the edges of the metal being notched to form stops for the ring and prevent it from slipping. The twine is passed through the bend in the metal and held by the rubber G, thereby preventing the cutter E G from slipping off the twine, but at the same time allow it to be moved on the twine. Now, as the twine is pulled for use, the cutter is slipped or moved up on the twine, and the twine cut off and let go, when the reel is revolved, as above described, winding up the twine until the cutter comes in contact with the lower loop or eye $f$ and stops the motion of the reel. On the pivot $d$ of the reel is a worm, H, in which works a spring-arm, I, to act as a gage to stop the reel or cage B C from running up too much loose twine when the cutter is not in use. In winding up the spring of the reel, the spring-arm I will move up the worm H, and, as the reel revolves back to wind up the twine, the arm moves down on the worm until it strikes a pin, $i$, in the head of the reel, thereby stopping the same. The pin $i$ may be drawn farther out or pushed in, according to the amount of twine which may be required to be wound up, as, by changing the length of the pin, the cage will revolve more or less times. When the cutter is used, the spring-arm I is placed on a pin, $y$, on the frame, so as to be away from the worm.

Having thus fully described our invention, what we claim as new, and desire to secure by Letters Patent, is—

1. The combination of the frame A, pivots $b$ $d$, cage B C, and spring D, all constructed substantially as and for the purposes herein set forth.

2. The combination of the cage B C, spring D, twine $x$, and cutter E G, all substantially as and for the purposes herein set forth.

In testimony that we claim the foregoing we have hereunto set our hands this 13th day of November, 1873.

ABIEL DAY HUNTLEY.
WILLIAM H. ESTY.

Witnesses:
JOSEPH B. HUTCHINSON,
LLEWELLYN POWERS.